United States Patent [19]

Stanley

[11] 4,415,228

[45] Nov. 15, 1983

[54] OPTICAL FIBER SWITCH APPARATUS

[75] Inventor: Frank L. Stanley, Lancaster, Ohio

[73] Assignee: Bell Telephone Laboratories, Incorporated, Murry Hill, N.J.

[21] Appl. No.: 295,521

[22] Filed: Aug. 24, 1981

[51] Int. Cl.³ .............................................. G02B 7/26
[52] U.S. Cl. ................................ 350/96.20; 310/330
[58] Field of Search .................... 350/96.20, 96.21; 310/330, 331, 332

[56] References Cited

U.S. PATENT DOCUMENTS 4,152,043  5/1979  Albanese .................... 350/96.20
4,223,978  9/1980  Kummer et al. ............. 350/96.20
4,303,302  12/1981  Ramsey et al. ............. 350/96.20

FOREIGN PATENT DOCUMENTS 52-49039  4/1977  Japan .......................... 350/96.20

OTHER PUBLICATIONS

P. G. Hale and R. Kompfner, "Mechanical Optical-Fibre Switch", Electronics Letters, vol. 12, No. 15, Jul. 22, 1976, p. 388.

Primary Examiner—John D. Lee
Attorney, Agent, or Firm—W. H. Kamstra

[57] ABSTRACT

Optical fiber switch apparatus for selectively coupling the end (16) of a first fiber (17) to the ends of a plurality of second fibers (10) circularly arranged within a housing (12) also enclosing the free end (16) of the first fiber (17). The latter (17) extends through a spherical bearing (20) seatable in socket (24) formed in the housing (12) end, the bearing having a disc (19) fitted about it at right angles to the axis of the first fiber (17). Arranged around the periphery of the housing (12) is a plurality of piezoelectric bimorph beams (27) having ends slightly below and outside the periphery of the disc (19). When one of the beams (27') is energized, its free end is deflected inward and under the edge of the disc (19). At this time a piezoelectric bimorph plate (33) is energized to deflect its center toward bearing (19) to tilt the disc (19) about a fulcrum presented by the end of the deflected beam against spring clips (22) acting on the housing (12) end. As a result, the free end (16) of the first fiber (17) is swung into juxtaposition with the end of a selected second fiber (10'). Continued downward urging of the bearing (20) into its socket (24) maintains the ends of the two fibers (17, 10') in abutment.

8 Claims, 4 Drawing Figures

OPTICAL FIBER SWITCH APPARATUS

TECHNICAL FIELD

This invention relates to optical fiber apparatus and more particularly to apparatus for selectively switching a transmission path between one optical fiber and a plurality of second fibers.

BACKGROUND OF THE INVENTION

Recent advances in optical fiber technology have promoted the use of these light conducting elements as promising alternative media in the transmission of information signals. Typically, such fibers are light-transparent glass threads on the order of 0.01 inch or less in diameter encased in a sheath or cladding to which it is fused. Light enters one end of the fiber and emerges from the opposite end with minimal loss. The physics of light transmission through a continuous fiber is now well-understood and need not be considered in detail for an understanding of the invention. As in its electrical counterpart, light transmission for broad circuit application requires some means for switching between one light transmission path and two or more other such paths. This has long been readily accomplished in the transmission of electrical signals by providing electro-mechanical relay or switch means which are interposed in the circuits to be controlled. The electrical conductors of the circuits are simply soldered or otherwise connected to the relay or switch terminals. The switching of light transmission paths which include optical fibers has been accomplished more directly. Known optical switching arrangements have generally contemplated the coupling of the actual light conducting media themselves without intervening contacting or circuit completion apparatus. Switching of light transmission paths thus has involved the mechanical movement of the end of the actual conducting fiber itself out of alignment with the end of a second fiber and into alignment with the end of a third fiber. One such prior art switching arrangement is disclosed in U.S. Pat. No. 4,223,978 of R. B. Kummer et al., issued Sept. 23, 1980. In the arrangement there disclosed, four passive fibers are fixedly maintained in the four corners of a square cross-sectioned inner channel of a rigid sleeve. An active fiber extends through a flexible, second sleeve fitted over the rigid sleeve and is arranged so that one end of the active fiber is moveable in a plane parallel to the plane of the ends of the passive fibers. The flexible sleeve may then be manually or machine flexed in either direction along two perpendicular axes to selectively bring the active fiber into alignment with the four passive fibers.

In another somewhat similar switching arrangement described in an article entitled "Mechanical Optical-Fibre Switch," by P. G. Hale et al., in *Electronics Letters*, Vol. 12, No. 15, July 22, 1976, the active fiber is fitted with a magnetically responsive metallic sleeve. The active fiber is then moved into selective alignment with the passive fibers by magnetic forces generated by an external electromagnet acting on the metallic sleeve. In each of the foregoing and other switching arrangements, the problem of achieving a precise optical connection between two fiber ends is presented. The ends of the extremely thin fibers must be in precise alignment without offset to achieve light transfer between the fiber ends. In order to minimize loss, the fiber ends must also be in extremely close proximity or actually abutting. These requirements demand that after a passive fiber of a plurality of passive optical fibers has been selected, the active fiber be precisely moved into coupling therewith. It is to these objectives that the optical switch apparatus of the invention is chiefly directed.

SUMMARY OF THE INVENTION

The foregoing and other objectives are realized in one illustrative optical fiber switch apparatus according to the invention in which a plurality of passive optical fibers are circularly and fixedly arranged with their longitudinal axes parallel within the bore of a cylindrical housing. Typically, the bore presents a star-shaped cross-section, each of the fibers being nestled in a "V"-shaped channel formed by the bore. The ends of all the fibers lying in the same plane toward one end of the housing. A single active optical fiber extends centrally in the housing bore from its other end, one end of the active fiber being moveable in a plane slightly removed from the plane of the ends of the passive fibers. The other end of the active fiber extends through a spherical bearing to which it is affixed, the bearing being seatable in a cup-shaped socket in the other end of the housing.

The cylindrical housing is formed to present annular inset extending a distance from the aforementioned other end and has circularly affixed thereto at a shoulder presented by the inset, a plurality of piezoelectric bimorph beams. The longitudinal axes of the beams lie parallel to the longitudinal axis of the cylindrical housing, the beams being angularly arranged to accord with the angular disposition of the passive fibers within the housing. The bimorph beams extend somewhat beyond the socket end surface of the housing and are freely moveable toward the inset surface of the housing. The spherical bearing has mounted on its periphery at a diameter a circular plate at right angles to the longitudinal axis of the active fiber extending through the bearing. The periphery of the circular plate extends only within the circle of the free ends of the bimorph beams and is separated therefrom by spring clips affixed to one side of the plate operating on the socket end surface of the cylindrical housing.

The assembly thus far described is mounted in and enclosed by a second cylindrical housing, one end of which is provided with a circular opening in the enclosure through which the active optical fiber is extended. The latter fiber is also centrally passed through a circular piezoelectrical bimorph disc resting on the spherical bearing and rigidly affixed at its periphery to the inner surface of the second housing opening. The switch apparatus is operated by first applying a voltage of suitable polarity to a terminal of a selected one of the plurality of bimorph beams. This beam, in accordance with the operation of such beams generally, is caused to deflect its free end inwardly toward the inner housing and under the periphery of the circular plate as a result. A suitable voltage is now applied to a terminal of the piezoelectric bimorph disc resting on the spherical bearing. The latter disc, as a result, is cupped toward the bearing urging it downward into its socket seat on the end of the inner housing. As the bearing is so moved, its outer circular plate is also moved toward the inner housing end surface against the action of its spring clips. At one point on its periphery, however, it meets the end of the deflected bimorph beam which acts as a fulcrum to tilt the plate thereby deflecting the inwardly extending active fiber into the retaining channel of the inner housing containing the selected passive fiber corresponding to the selected bimorph beam. Advantageously, as the circular plate it tilted, it not only brings the active fiber and the selected passive fiber into precise alignment, but also brings the ends of the two fibers into abutment to ensure positive coupling. At this time, the voltage deflecting the selected bimorph beam may be removed, the force of the plate on its fulcrum end maintaining the switch in its operative state. The switch is restored to its normal state by removing the actuating voltage from the bimorph disc, the bimorph members being restored to their normal states by the hysteretic characteristic of their remanent polarizations and the action of plate spring clips.

BRIEF DESCRIPTION OF THE DRAWING

The organization and operation of an optical switch apparatus according to the principles of the invention together with its features will be better understood from a consideration of the detailed description of one illustrative embodiment thereof which follows when taken in conjunction with the accompany drawing in which.

DETAILED DESCRIPTION

Figure 2:
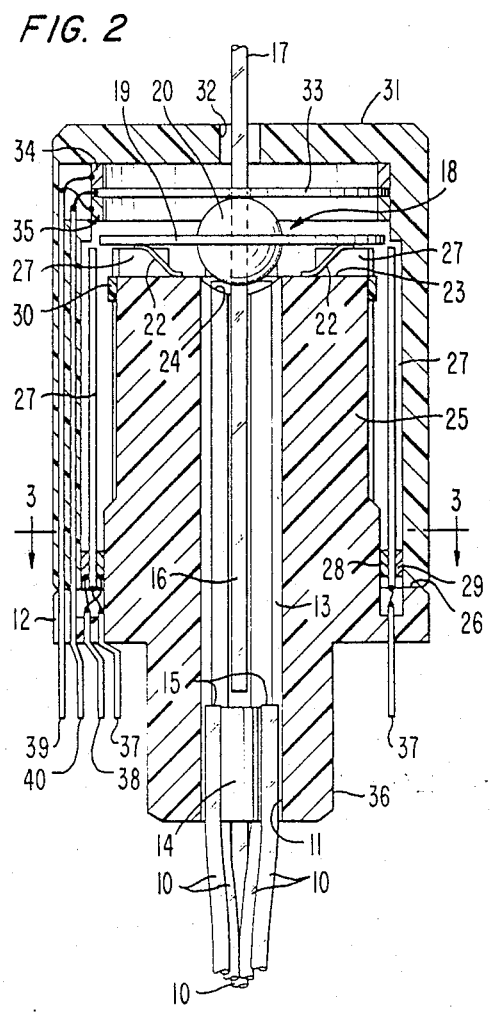

In one specific illustrative optical fiber switch apparatus according to the principles of the invention, representative ones of a plurality (here eight) of known conventional optical fibers 10 are shown in FIG. 2 as extending partially into a bore 11 of an enclosing circular housing 12 which is formed of any suitable insulative material. Bore 11 is formed substantially star-shaped in cross-section (FIG. 3) to present a plurality of "V"-shaped channels 13 for its entire length in which channel fibers 10 are firmly retained by a retaining plug 14. The faces 15 of the ends of fibers 10 lie in a common plane perpendicular to the longitudinal axis of bore 11. Extending into bore 11 of housing 12 from its other end is the free end 16 of a second known conventional optical fiber 17 which fiber is fixedly passed through an actuating member 18 which in the illustrative embodiment comprises a disc 19 fitted about a central, substantially spherical bearing 20. Disc 19 and its bearing 20 may be fabricated separately or may be integrally formed of any suitable insulative plastic material. The face 21 of the free end 16 of fiber 17 is maintained a slight distance from the plane of faces 15 of the ends of fibers 10 by spring clips 22 affixed to disc 19 acting on an end surface 23 of housing 12 perpendicular to the longitudinal axis of bore 11. Spring clips 22 also maintain bearing 20 substantially the same distance out of a spherical socket 24 formed in surface 23 at the end of bore 11.

Figure 1:
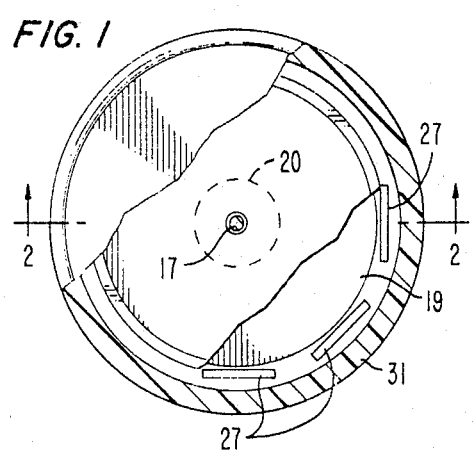
FIGS. 1 and 2 are broken-away sectional top and sectional side views respectively, of one illustrative optical fiber switch apparatus according to the invention, the latter view being taken along the lines 2—2 of the view of FIG. 1.
Figure 3:
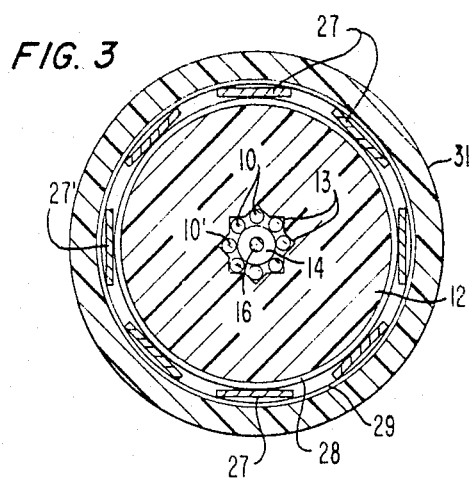
FIG. 3 is a sectional view of the switch apparatus of FIGS. 1 and 2 taken along the lines 3—3 of the view of FIG. 2.

Housing 12 is formed with an annular inset 25 to present a shoulder 26 about its periphery on which shoulder rest the ends of a plurality of piezoelectric beams 27, representative ones of which are shown in FIG. 2, retained off the surface of the inset 25 between an inner and outer, electrically conductive retaining ring 28 and 29, respectively. Beams 27 are circularly arranged about the housing 12 to correspond in angular separations to that of "V"-shaped channels 13 and, therefore, to the angular separation of first optical fibers 10 retained therein (FIGS. 1 and 3). Beams 27, fixed at one end as described, extend parallel with the longitudinal axis of bore 11 toward actuating member 18, their free ends extending to just under the under surface of disc 19 and slightly outside its periphery (FIG. 2). As will be considered in greater detail hereinafter, inset 25 is formed and dimensioned so that the free ends of beams 27 are deflectable under the periphery of disc 19 at bearing surfaces presented thereon to an annular, insulative stop 30 fitted about inset 25 at the end of housing 12.

Fitted over the assembly thus far described and resting on shoulder 26 of housing 12, is a second, outer cylindrical housing 31 which may be press-fitted at the shoulder 26 and about outer retaining ring 29. At its closed other end, housing 31 is provided with a central aperture 32 through which second optical fiber 17 is passed. At the closed end and within its inner surface is fitted a piezoelectric circular bimorph plate 33 through which fiber 17 also centrally passes, plate 33 being retained in housing 31 between a pair of electrically conductive rings 34 and 35 to have its under surface in contact with the surface of bearing 20. The character and operation of the piezoelectric bimorph elements mentioned are well known in the art. These elements conventionally comprise a conductive centervane separating two layers of suitable piezoelectric material on the outer surface of each of which is affixed an electrode layer of electrically conductive material, these layers being in electrical contact with retaining rings 28, 29, 34, and 35, in the switch embodiment being described.

Electrical connections for the switch apparatus are made by conductors which may be molded in housing 12 and 31 and to which ready access may be had within its outer periphery by an additional annular inset 36 formed in its surface. The bimorph elements of the switch apparatus are conventionally operated by the application of an operate voltage of suitable magnitude and polarity to their centervanes, the outer electrodes being conventionally connected to ground potential. Thus, the centervanes of each of the bimorph beams 27 are electrically extended to external terminals 37, two representative ones of which are shown in the section view of FIG. 2. The outer electrodes of beams 27 are electrically extended via retaining rings 28 and 29 to an external ground terminal 38. Similarly, the outer electrodes of bimorph plate 33 are electrically extended via retaining rings 34 and 35 to an external ground terminal 39, the centervane of plate 33 being so extended to an external terminal 40. Optical fibers 10 and 17 are shown in the drawing as unterminated. It will be appreciated that in practice these fibers will be coupled to suitable light generating and receiving devices well-known in the art, which devices need not here be considered as not comprising elements of the switch apparatus of the invention.

Figure 4:
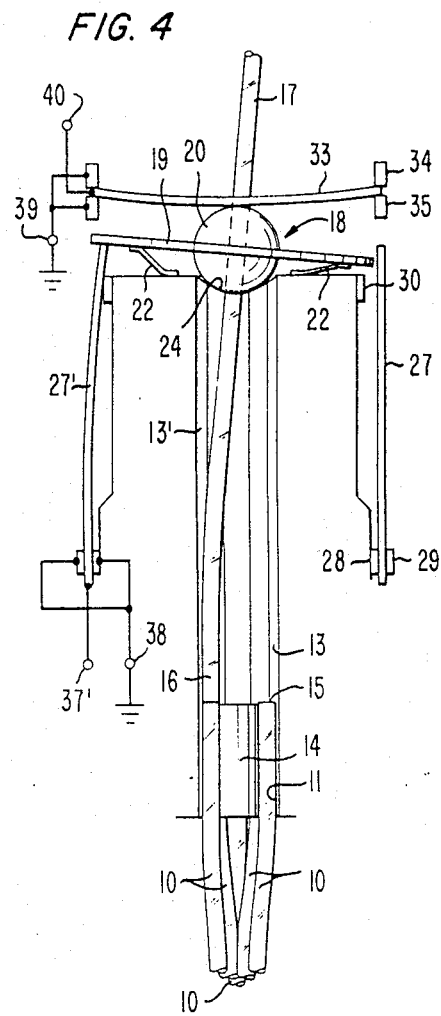
FIG. 4 is an abbreviated view of the view of the switch apparatus of FIG. 2 depicting the apparatus in one of its operated states.

With the foregoing organization of an illustrative switch apparatus according to the invention in mind, an illustrative operation thereof may now be considered with particular reference to FIG. 4 which is an abbreviated version of the view of FIG. 2, identical elements being designated by the same reference characters. For the illustrative operation, it will be assumed that free end 16 of second fiber 17 is to be coupled to the end of fiber 10' of the plurality of first fibers 10. A voltage of suitable magnitude and polarity is initially selectively applied to the centervane terminal 37' of bimorph beam 27' angularly positioned along the same radius as that occupied by fiber 10' with which the coupling is to be made (FIG. 3). The remaining terminals 37 are unenergized. As a result, the free end of bimorph beam 27 is deflected inward to ring stop 30 and under the periphery of actuating member disc 19. A voltage of suitable magnitude and polarity is now applied to terminal 40 of bimorph plate 33 causing a central deflection or "cupping" toward spherical bearing 20. The latter element is urged toward its socket 24 in turn causing disc 19 to tilt about a fulcrum presented by the end face of deflected bimorph beam 27' against the bias of spring clips 22. As a result, the free end 16 of fiber 17 is deflected laterally into bore channel 13' also occupied by selected fiber 10'. When disc 33 is fully centrally deflected, bearing 20 will be fully seated in its socket 24 and the face of free end 16 of fiber 17 will be in abutment with face 15 of selected fiber 10'. At this time the voltage being applied to terminal 37' may be removed, the switch being maintained in its operated state by the continuing voltage on terminal 40 and the cupping of plate 33. The force exerted by the latter action on disc 19 and thereby on the end of bimorph beam 27' maintains the latter in its deflected state. The switch apparatus is subsequently restored to its unoperated state by the action of spring clips 22 upon the removal of the energizing voltage on terminal 40. The bimorph elements are also restored to their normal states by the hysteretic characteristic of their remanent polarizations.

What has been described is considered to be only one specific illustrative optical fiber switch apparatus according to the principles of the invention. Accordingly, it is to be understood that various and numerous other arrangements may be devised by one skilled in the art without departing from the spirit and scope of the invention as limited only by the accompanying claims.

What is claimed is:

1. Optical fiber switch apparatus comprising a plurality of fixed first optical fibers having circularly arranged ends, an actuating member having circularly disposed bearing surfaces arranged to correspond to said circularly arranged fiber ends, said member being mounted to be tiltable about points around its periphery, a second optical fiber fixedly extending substantially centrally through said actuating member, said second fiber having a free end extending toward said ends of said first fibers substantially centrally thereof, a plurality of piezoelectric bimorph beams having ends circularly disposed respectively outside and under the periphery of said bearing surfaces of said actuating member, said beams being selectively energizable to deflect one of said beams under one of said bearing surfaces, and a piezoelectric bimorph plate fixedly mounted about its periphery and operable on said actuating member, said plate being energizable to cup said plate thereby to tilt said actuating member about a fulcrum presented by said one of said beams to swing said free end of said second fiber into alignment and abutment with the end of a selected one of said plurality of first fibers.

2. Optical fiber switch apparatus as claimed in claim 1 also comprising a first housing having a bore formed therein, said ends of said plurality of first optical fibers extending into said bore, and means for aligning said actuating member comprising a substantially spherical surface extending from said actuating member, said first housing having a substantially spherical socket at one end surface thereof for seating said spherical surface.

3. Optical fiber switch apparatus as claimed in claim 2 also comprising means for biasing said actuating member and thereby said free end of said second fiber in an unoperated position comprising spring means acting between said actuating member and said one end surface of said first housing.

4. Optical fiber switch apparatus as claimed in claims 2 or 3 in which said bore of said first housing has a substantially star-shaped cross-section to present a plurality of "V"-shaped channels lying parallel with the longitudinal axis of said bore for locating respectively said plurality of first fibers and for guiding said free end of said second fiber.

5. Optical fiber switch apparatus as claimed in claim 4 also comprising a substantially spherical bearing fitted centrally through said actuating member, said spherical surface extending from said actuating member comprising a portion of the surface of said spherical bearing.

6. Optical fiber switch apparatus as claimed in claim 5 in which said actuating member comprises a disc.

7. Optical fiber switch apparatus as claimed in claim 5 also comprising an outer, second housing fitted over said first housing, said piezoelectric bimorph plate being mounted in said second housing.

8. Optical fiber switch apparatus as claimed in claim 7 in which said piezoelectric plate is substantially circular.

* * * * *